United States Patent
Park

(10) Patent No.: US 6,279,824 B1
(45) Date of Patent: Aug. 28, 2001

(54) METHOD AND APPARATUS FOR PERFORMING AN ELECTRONIC MONEY TERMINAL FUNCTION USING A SMART CARD

(75) Inventor: Ju-ha Park, Yongin (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/041,660

(22) Filed: Mar. 13, 1998

(30) Foreign Application Priority Data

Mar. 14, 1997 (KR) .................................................. 97-8749

(51) Int. Cl.$^7$ .................................................. G06F 17/60
(52) U.S. Cl. .................................................. 235/379; 235/375
(58) Field of Search .................................................. 235/379, 380, 235/375; 705/42, 43

(56) References Cited

U.S. PATENT DOCUMENTS

| | | | |
|---|---|---|---|
| 5,025,373 | * 6/1991 | Keyser, Jr. et al. | 364/408 |
| 5,175,416 | * 12/1992 | Mansvelt et al. | 235/379 |
| 5,220,501 | * 6/1993 | Lawlor et al. | 364/408 |
| 5,282,249 | * 1/1994 | Cohen et al. | 380/23 |
| 5,325,431 | * 6/1994 | Naruse | 380/16 |
| 5,473,143 | * 12/1995 | Vak et al. | 235/380 |
| 5,557,516 | * 9/1996 | Hogan | 364/406 |
| 5,754,655 | * 5/1998 | Hughes et al. | 380/24 |
| 5,796,832 | * 8/1998 | Kawan | 380/24 |
| 5,850,442 | * 12/1998 | Muftic | 380/21 |
| 5,870,724 | * 2/1999 | Lawlor et al. | 705/42 |
| 5,937,396 | * 8/1999 | Konya | 705/43 |
| 5,973,756 | * 10/1999 | Erlin | 348/734 |
| 5,999,624 | * 12/1999 | Hopkins | 380/24 |

FOREIGN PATENT DOCUMENTS

| | | | |
|---|---|---|---|
| 2-1049 | 1/1990 | (JP) | G06F/15/30 |
| 6-162059 | 6/1994 | (JP) | G06F/15/30 |
| 9-500743 | 1/1997 | (JP) | G06F/19/00 |
| 9-44576 | 2/1997 | (JP) | G06F/19/00 |

OTHER PUBLICATIONS

"Soon, Home Will Be Where the Smart Card Is", Valerie et al., BLOCK, American Banker, Jul. 24, 1996, vol. 161, No. 140.

Microsoft Money, "Guide to Personal Finance"; Nelson, Stephan L.; Sep. 1996 ($2^{nd}$ ed.) (pp. 100–109).

\* cited by examiner

Primary Examiner—Karl D. Frech
(74) Attorney, Agent, or Firm—Sughrue, Mion, Zinn, Macpeak & Seas, PLLC

(57) ABSTRACT

A receiver and method for performing an electronic money terminal function such that a user does not need to go personally to the user's bank to make a deposit or withdrawal to or from an electronic money smart card. The method includes the steps of initializing an electronic money smart card which is input during an electronic money terminal mode, selecting a submode for the electronic money terminal mode, connecting, using a modem, the receiver to a host computer of a bank which issued the electronic money smart card, transmitting the selected submode, a personal identification number (PIN) stored in the electronic money smart card, and a secret number input from an external source, to the host computer, and performing the selected submode when the input secret number is identical to a secret number stored in the host computer.

13 Claims, 8 Drawing Sheets

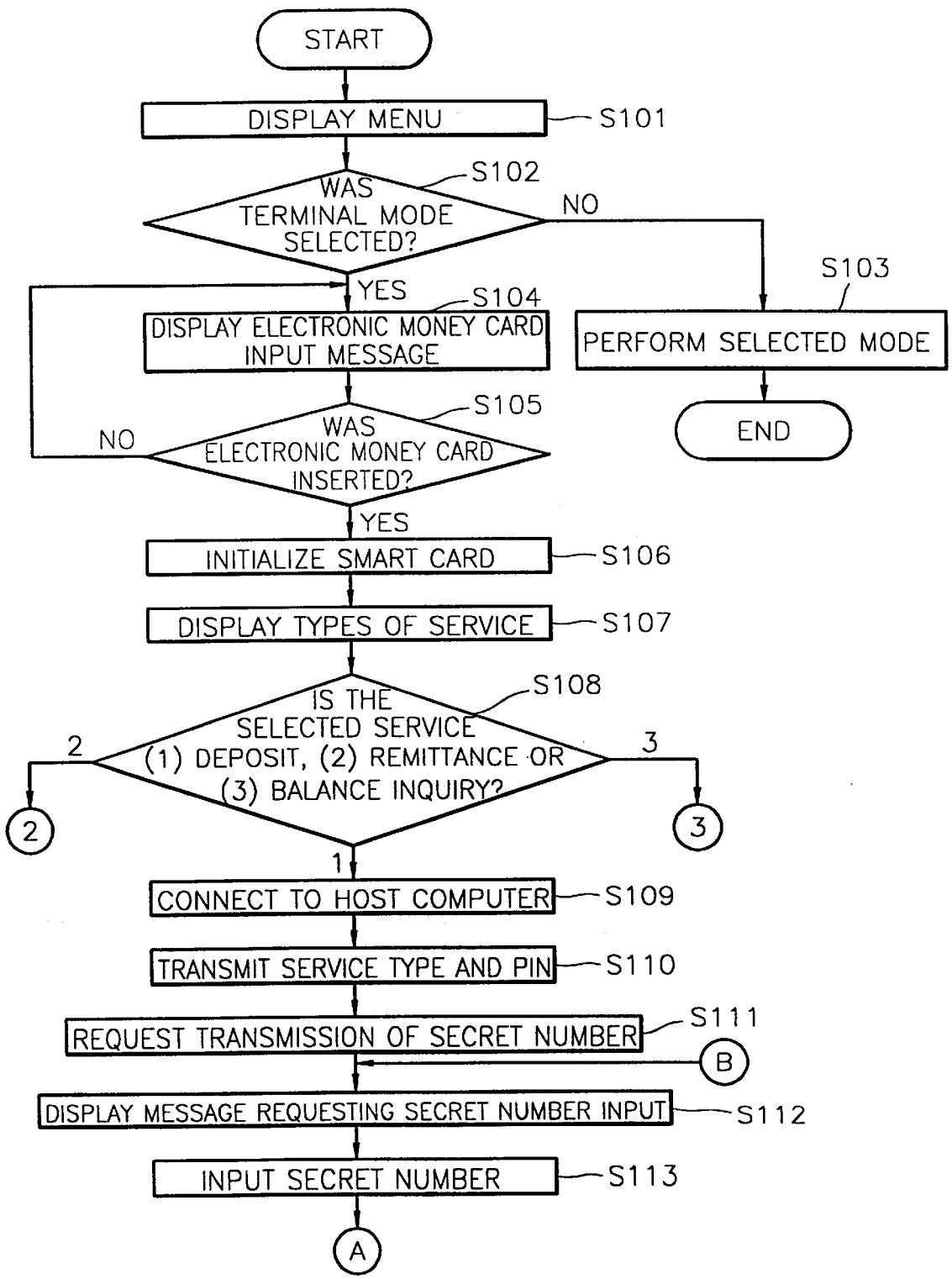

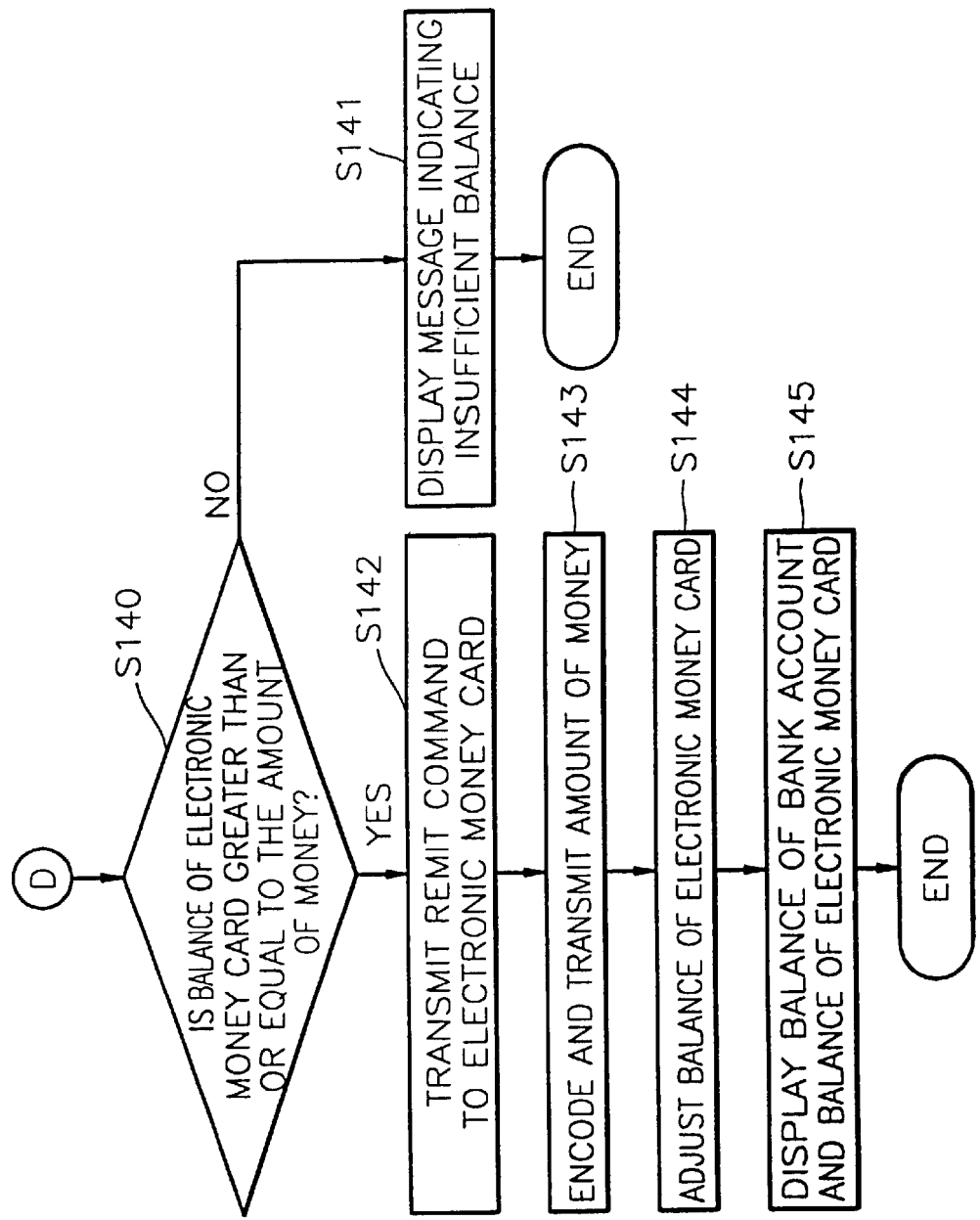

METHOD AND APPARATUS FOR PERFORMING AN ELECTRONIC MONEY TERMINAL FUNCTION USING A SMART CARD

BACKGROUND OF THE INVENTION

1. Field of the Invention

The present invention relates to a method and receiver, including an electronic money terminal function, for performing the electronic money terminal function, and more particularly, to a receiver whereby various bank services such as deposit and withdrawal of money to and from an electronic money card can be performed at home and on-line by connecting a satellite broadcasting receiver provided with a smart card and a modem to a host computer of the bank, and a method for performing the various bank services. The present application is based upon Korean Application No. 97-8749, which is incorporated herein by reference.

2. Description of Related Art

With the development of the smart card came the concept of its use for electronic money. An electronic money card can be used not only in mass transportation such as subways or buses, but also in stores and restaurants. When a person spends all of the money placed on the electronic money card, that person can reuse the electronic money card by going to the bank and depositing more money to the electronic money card from the person's bank account using an electronic money terminal.

FIG. 1 is a block diagram of a typical electronic money terminal. Referring to FIG. 1, a smart card interface (hereinafter, I/F) 102 informs a microprocessor unit (MPU) 104 that an electronic money smart card was input. The MPU 104 recognizes the input of the smart card, initializes the smart card according to a system program stored in a memory 114, and displays a services menu, including types of services, on a display 108 by controlling an on-screen display (OSD) processor 106. Here, the memory 114 is comprised of a RAM and a ROM. The RAM temporarily stores data required to perform an electronic money terminal function, and the ROM stores system and application programs.

When a user uses a keypad 110 to select a desired type of service from the services menu displayed on the display 108, the MPU 104 applies to a transmission I/F 112 a command for connecting the terminal to a host computer (not shown) of the bank. The transmission I/F 112 connects the terminal to the host computer in response to the received command. After the connection of the terminal to the host computer is completed, the user's desired type of service and a user identification number stored in the smart card (electronic money card) 100 are transmitted to the host computer. Then, the host computer applies a command for requesting input of a user's password to the MPU 104 via the transmission I/F 112. The MPU 104 displays a message such as "enter password" on the display 108 by controlling the OSD processor 106. The user inputs a password via the keypad 110 in response to the password input message. The MPU 104 recognizes the input password and transmits the user's password to the host computer of the bank via the transmission I/F 112. The host computer 112 compares the input user's password with a user's password stored in a database, and performs the desired service when the two passwords are identical.

However, when a user wants to deposit money to increase the balance on the electronic money card, the user must go to the bank in person and transfer the money from the user's bank account to the electronic money card using the electronic money terminal.

SUMMARY OF THE INVENTION

Accordingly, it is an object of the present invention to provide a method for performing various bank services, such as the deposit and withdrawal of money to and from an electronic money card, at home and on-line, by connecting a receiver provided with a smart card I/F and a modem to a host computer of the bank.

It is another object of the present invention to provide a receiver for performing various bank services, such as the deposit and withdrawal of money to and from an electronic money card, at home and on-line, by connecting a receiver to a host computer of the bank.

To accomplish the first object, there is provided a method of performing an electronic money terminal function using a receiver having a smart card interface and a modem. The method comprises the steps of initializing an electronic money smart card which is input during an electronic money terminal mode, selecting a submode of the electronic money terminal mode, connecting, using the modem, the receiver to a host computer of a bank which issued the electronic money smart card, transmitting the selected submode, a personal identification number stored in the electronic money smart card, and a secret number input from an external source, to the host computer, and performing the selected submode when the input secret number is identical to a secret number stored in the host computer.

To accomplish the second object, there is provided a receiver which performs, which receives charge-free and charged channel signals, for performing an electronic money terminal function. The receiver comprises a smart card, a modem, a memory, a controller and an on-screen display processor. The smart card interface detects an input of an electronic money smart card and transmits a personal identification number from the electronic money smart card. The modem connects the receiver to a host computer of a bank. The memory stores data representing a screen menu with respect to an electronic money terminal mode and its submodes and data representing a telephone number of the bank which issued the electronic money smart card. The controller recognizes the electronic money terminal mode set by a user and submodes of the electronic money terminal mode, and transmits the telephone number data to the modem to connect the modem to the host computer, transmits the personal identification number transmitted via the smart card interface and the recognized submode data to the host computer, and applies a control signal in response to a command for performing the submode transmitted from the host computer via the modem. The on-screen display processor displays the screen menu as on-screen display information and generates a message, which is required to perform the submode, in response to the control signal.

BRIEF DESCRIPTION OF THE DRAWINGS

The above objects and advantages of the present invention will become more apparent by describing in detail a preferred embodiment thereof with reference to the attached drawings in which:

FIGS. 3A through 3E are flowcharts illustrating an electronic money terminal function of the satellite broadcasting receiver according to an embodiment of the present invention.

DETAILED DESCRIPTION OF THE INVENTION

Figure 1:
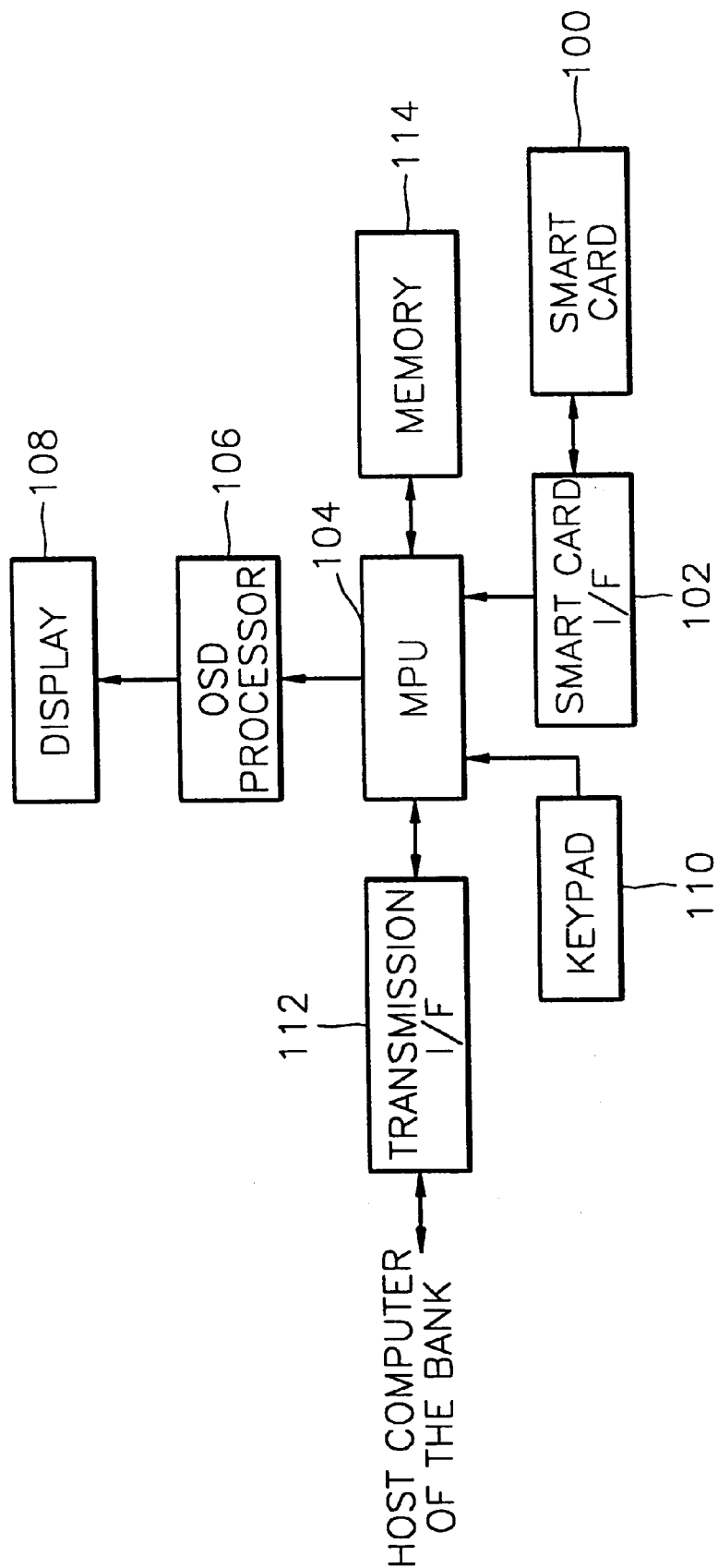
FIG. 1 is a block diagram of a typical electronic money terminal.
Figure 2:
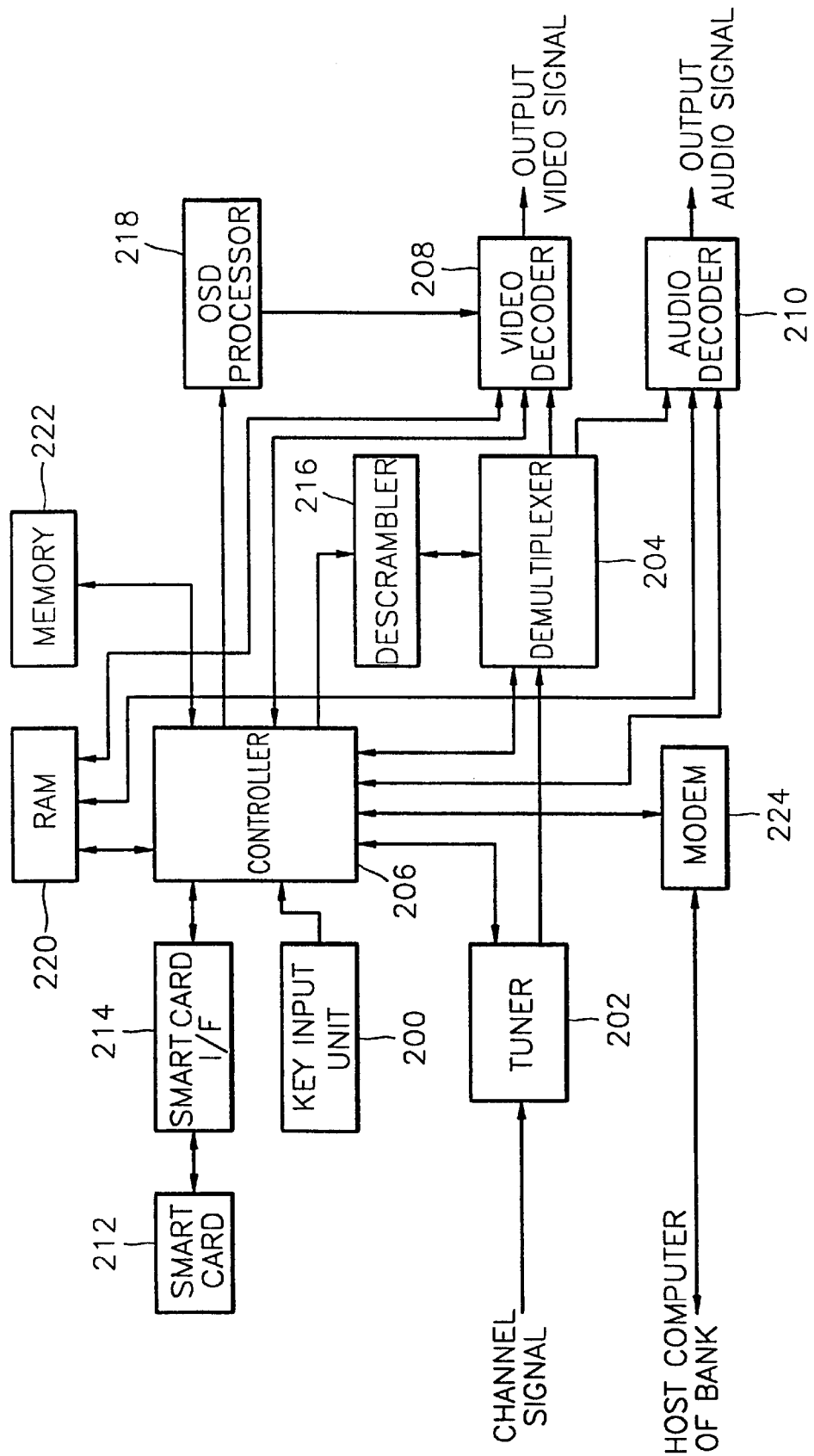
FIG. 2 is a block diagram of a satellite broadcasting receiver including an electronic money terminal function according to an embodiment of the present invention.

Referring to the satellite broadcasting receiver of FIG. 2, the output port of a key input unit 200 provided with a keypad is connected to a controller 206. A tuner 202 has an input port to which satellite broadcasting signals of multiple channels are input, an output port connected to an input port of a demultiplexer 204, and a control signal input/output port connected to the controller 206. In the demultiplexer 204, a control signal input/output port and first and second output ports are connected to the controller 206, a video decoder 208 and an audio decoder 210, respectively. The video decoder 208 has a second input port connected to an output port of an OSD processor 218, a control signal input/output port connected to the controller 206, a data input/output port connected to a RAM 220, and an output port through which a decoded video signal is output. The OSD processor 218 has a control signal input port connected to the controller 206. The audio decoder 210 has a control signal input/output port connected to the controller 206, a data input/output port connected to the RAM 220, and an output port through which a decoded audio signal is output. An input/output port of a smart card 212 is connected to a smart card I/F 214 whose input/output port is connected to the controller 206. A descrambler 216 has a control signal input port connected to the controller 206 and an input/output port connected to the demultiplexer 204. The data input/output ports of the RAM 220 and a memory 222 are connected to the controller 206. A modem 224 is connected to a host computer (not shown) of the bank, a program supplying company or a subscriber managing center, via a telephone line. The control signal input/output port of the modem 224 is connected to the controller 206.

The operation of the satellite broadcasting receiver shown in FIG. 2 will now be described by dividing the operation into a broadcast receiving function and an electronic money terminal function.

I. Broadcast Receiving Function

Channel of a cable television or a video-on-demand (VOD) receiver, as well as a satellite broadcasting receiver, can be divided into charge-free channels and charged channels based on fee calculation methods. The charge-free channels are channels that everyone can watch without paying a TV subscription fee, needing only a receiver. The charged channels can be again divided into subscriber channels and pay-per-view channels. In the subscriber channels, when a subscriber subscribes to a channel to watch a program of a channel, the subscriber can watch all programs in the channel if the subscriber pays a TV subscription fee based on a predetermined period (e.g., a month) regardless of the time during which programs are watched. The pay-per-view channels are channels in which a TV subscription fee is paid only for the programs that a viewer watches. As for the pay-per-view channels, data of charged programs are scrambled to prevent people who do not pay the TV subscription fee from watching the pay-per-view programs.

Therefore, broadcasting reception can be divided into charge-free channel reception, subscriber channel reception and pay-per-view channel reception.

(i) Charge-Free Channel Reception

A plurality of channel signals multiplexed in transport packet form are input to the demultiplexer 204 via the tuner 202. The demultiplexer 204 divides multiplexed data, on a channel selected by a user using the key input unit 200 from the plurality of multiplexed channels received via the tuner 202, into video and audio data each having a packet identification (PID) of the selected channel. The controller 206 checks a control bit representing scramble information (i.e., information indicating whether the selected channel is scrambled) included in the header of the divided data. Then, if the selected channel is not scrambled, the controller 206 does not operate the descrambler 216, and applies a control signal indicating that the channel is not scrambled to the demultiplexer 204. At this time, the demultiplexer 204 applies the video and audio data, divided from a transport packet of the selected channel in response to the control signal provided by the controller 206, to the video and audio decoders 208 and 210, respectively. The video and audio decoders 208 and 210 decode the divided video and audio data and output decoded video and audio signals through a display (not shown) and a speaker (not shown), respectively. Here, the key input unit 200 can be keys installed on a remote controller or a receiver set.

(ii) Subscriber Channel Reception

A plurality of channel signals multiplexed in a transport packet are applied to the demultiplexer 204 through the tuner 202. The demultiplexer 204 divides multiplexed data, on a channel selected by a user using the key input unit 200 from the plurality of multiplexed channels received through the tuner 202, into video and audio data each having the PID of the selected channel, and applies the headers of the divided data to the controller 206. The controller 206 checks the control bit representing the scramble information included in the divided header. If it is determined that the selected channel is scrambled, first, a check of whether the smart card 212 was inserted is made to determine whether the viewer is a charged channel subscriber. If the smart card 212 was not inserted, the controller 206 applies a control signal to the OSD processor 218 and displays on a display a message requesting the subscriber to insert the smart card 212. Then, the controller 206 reads a personal identification number (PIN) from the smart card 212, compares the read information with PIN information prestored in the memory 222 or PIN information provided by an external source, and applies a control signal to allow the descrambler 216 to operate if the PIN information from the smart card 212 is the same as that prestored in the memory 222 or that provided by the external source. Here, the PIN information input from the external source is PIN information input by the user via the key input unit 200. At this time, the descrambler 216 restores the scrambled video and audio data divided by the demultiplexer 204 to non-scrambled signals, and applies the non-scrambled video and audio data to the video and audio decoders 208 and 210, respectively, via the demultiplexer 204. The video and audio decoders 208 and 210 decode the descrambled video and audio data and output the decoded video and audio signals through a display and a speaker, respectively.

At this time, in the subscriber channel, the TV subscriber fee is calculated on the basis of a predetermined period of time, so watched programs do not need to be stored in the smart card 212.

(iii) Pay-Per-View Channel

The memory 222 stores help screen menu data including information guiding the selection of a pay-per-view program. The controller 206 recognizes the input of the smart card 212 and displays a help screen by controlling the OSD processor 218. A subscriber selects a menu for a pay-per-view program, transmitted from a program supplying company, from displayed menus using the key input unit 200.

A pay-per-view channel signal transmitted in response to the selection of a viewer is applied to the demultiplexer 204 through the tuner 202. The pay-per-view channel signal includes program guiding data, entitlement control message (ECM) data and program data. Here, the ECM data is comprised of a channel number, present time information, an ID for determining whether a viewer is qualified to watch a pay-per-view program, and a toggle bit indicating the start and end of a program. The ECM data is input at a predetermined period of time (e.g., 8 seconds). The demultiplexer 204 demultiplexes the pay-per-view channel signal received through the tuner 202 into the program guiding data, the ECM data and the program data. After the demultiplexed ECM data is applied to the smart card 212 through the controller 206, and when an ID, included in the ECM data, for determining whether a viewer is qualified to receive a program is identical to that stored in the smart card 212, the smart card 212 decodes the applied ID and applies the same as a control word to the descrambler 216 via the controller 206. Here, the smart card 212 includes a memory and an MPU. The memory stores an ID representing a qualification for watching programs, and PIN information of the smart card, and has a storage area for storing a list of items watched. The MPU controls the writing and reading of data stored in the memory, and decodes the ECM data transmitted through the controller 206 to output the same as a control word.

The descrambler 216 receives program data demultiplexed in the demultiplexer 204 according to a control word applied through the controller 206 and descrambles the scrambled program data. The demultiplexer 204 divides the descrambled program data received from the descrambler 216 into video and audio data. The video and audio decoders 208 and 210 decode the descrambled video and audio data, respectively, applied from the demultiplexer 204 and output the decoded video and audio signals to a display and a speaker, respectively. At this time, a list of the items of a pay-per-view program that a user selects and watches is stored in the smart card 212, and transmitted to a program supplying company via the modem 224 after a predetermined period of time.

Meanwhile, the RAM 220 writes and reads data processed by the controller 206 and data necessary for the operation of the decoders 208 and 210 thereto and therefrom. Preferably, the memory 222 is an electrically erasable and programmable ROM (E$^2$PROM) or a flash memory. The memory 222 stores system programs, setting parameters and data even when the receiver is turned off, and also stores new programs downloaded via the modem 224.

II. Electronic Money Terminal Function

Figure 3B:
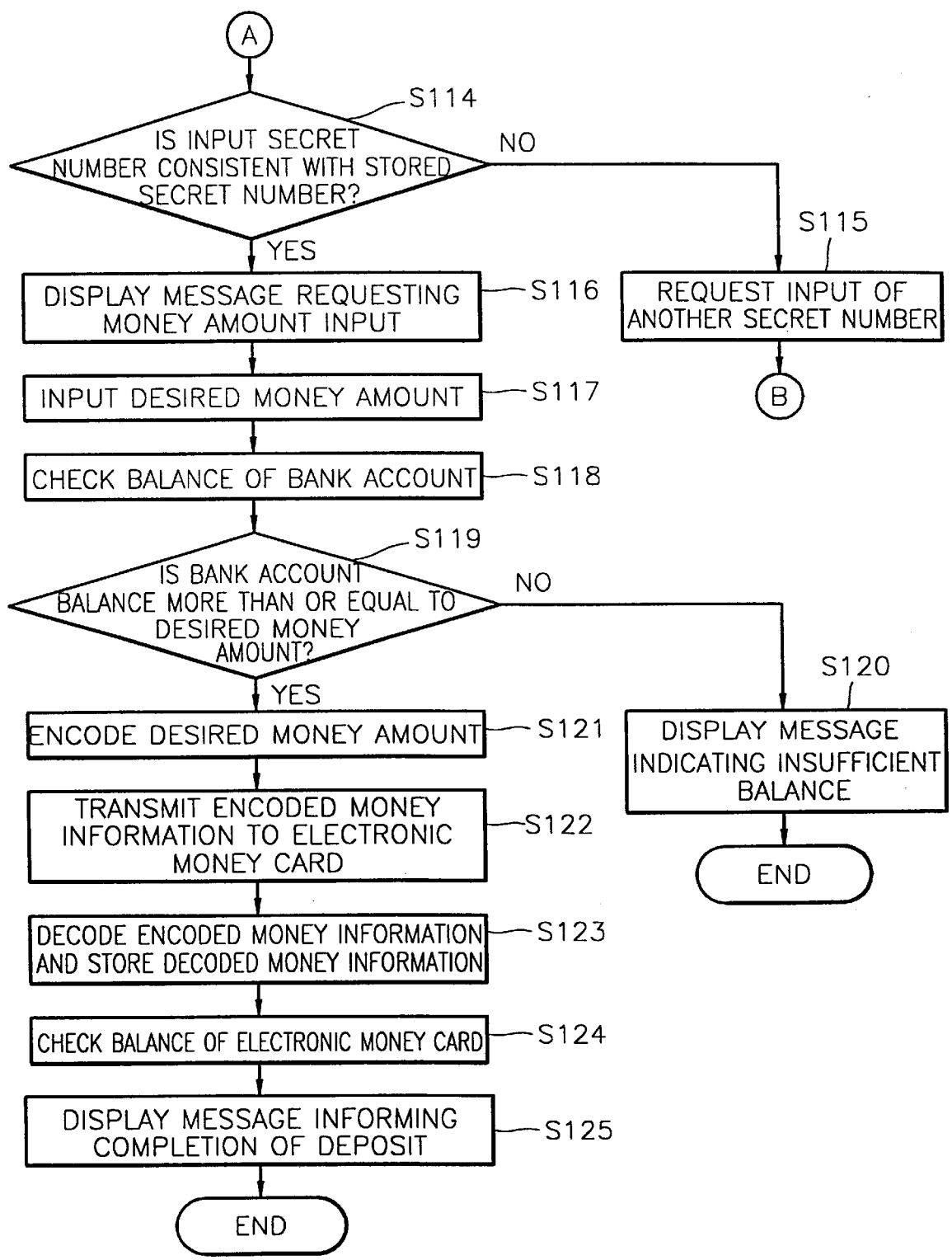

The electronic money terminal function according to the present invention can be performed by merely changing software installed in the memory 222, without making changes to the hardware of the satellite broadcasting receiver shown in FIG. 2. This function will be described referring to FIGS. 3A through 4.

First, the memory 222 stores not only help menu data for satellite broadcasting reception but also menu data for electronic money terminal services, and telephone number data required to connect to a host computer of the bank. The telephone number data can be set by the user.

Immediately after power is applied to the receiver, the OSD processor 218 displays a main screen menu in response to a control signal of the controller 206 (step S101 of FIG. 3A). A subscriber selects a terminal mode for the electronic money terminal function from the main screen menu using the keypad of the key input unit 200 (step S102). The terminal mode can be directly selected by a key (terminal mode selection key) installed on the key input unit 200.

If the terminal mode was not selected in step S102, the function of the other selected mode is performed (step S103). However, if the terminal mode was selected in step S102, the controller 206 controls the OSD processor 218 to display a message requesting the removal of the satellite broadcasting smart card and the input of the user's electronic money smart card (step S104). The controller 206 determines whether the electronic money smart card 212 was inserted (step S105). If the electronic money smart card 212 was not inserted, the procedure returns to step S104. On the other hand, if the electronic money smart card 212 was inserted, the electronic money smart card 212 is initialized (step S106).

After the electronic money smart card 212 is initialized in step S106, the controller 206 displays a submenu representing the types of services for an electronic money terminal mode by controlling the OSD processor 218 (step S107). For instance, the displayed submenu of the service types can include (1) a deposit service mode for depositing a desired amount of money from a bank account to an electronic money card, (2) a remittance service mode for remitting money from an electronic money card to a bank account, and (3) a balance inquiry service mode for inquiring about the balance of a bank account.

First, it is determined whether a service selected by a user is the deposit service mode (1) for depositing money from a bank account to an electronic money card (step S108). The receiver tries to make contact by making a call with a bank on-line contact number prestored in the memory 222, using the modem 224 (step S109). The bank on-line contact number (i.e., a telephone number) stored in the memory 222 can be set by the user.

When the receiver is connected to the host computer of the bank via the modem 224, the controller 206 transmits a service type (in this case, the deposit service (1)) desired by the user and a PIN stored in the electronic money smart card 212, to the host computer via the modem 224 (step S110). Then, the host computer transmits a command requesting the transmission of a user's secret number to the controller 206 via the modem 224 (step S111). The controller 206 displays a message requesting the input of the secret number on the display screen, by controlling the OSD processor 218 (step S112). When the user inputs the secret number through the keypad of the key input unit 200 in response to the secret number input request message, the controller 206 recognizes the key data and transmits the secret number to the host computer via the modem 224 (step S113). The host computer compares the secret number input in step S113 with the user's secret number stored in the database (step S114 of FIG. 3B). When the secret numbers are consistent with each other, the desired deposit service mode is performed. Otherwise, a message requesting the input of another secret number is transmitted to the controller 206 via the modem 224, and at step 115, the procedure returns to step S112.

When the prestored secret number is consistent with the input secret number in step S114, the host computer transmits a control signal indicating the above fact to the controller 206 via the modem 224, and the controller 206 displays on a screen a message requesting the input of the desired amount of money by controlling the OSD processor 218 (step S116). When the user inputs the desired money amount through the keypad of the key input unit 200 (step S117), the input money information is transmitted to the host computer via the controller 206 and the modem 224, and the host computer checks the balance of the user's bank account (step S118). After the checked balance of the bank account is compared with the amount of money input (step S119), if the balance of the bank account is smaller than the requested money amount, a control signal indicating the above fact is transmitted to the controller 206 via the modem 224. At this time, the controller 206 displays on a screen a message indicating the insufficient balance by controlling the OSD processor 218 (step S120).

On the other hand, if the balance of the bank account is more than or equal to the requested amount of money in step S119, information corresponding to the requested amount of money is encoded (step S121), and the encoded money information is transmitted to the electronic money smart card 212 (step S122). The MPU inside the electronic money smart card 212 is operated to decode the encoded money information and store the result in the memory inside the electronic money card 212 (step S123). The controller 206 transmits a control signal for checking the balance of the electronic money card, to the electronic money smart card 212 (step S124). The controller 206 informs the user of the balance information output from the electronic money smart card 212 by controlling the OSD processor 118, and completes the deposit service (step S125).

Figure 3C:
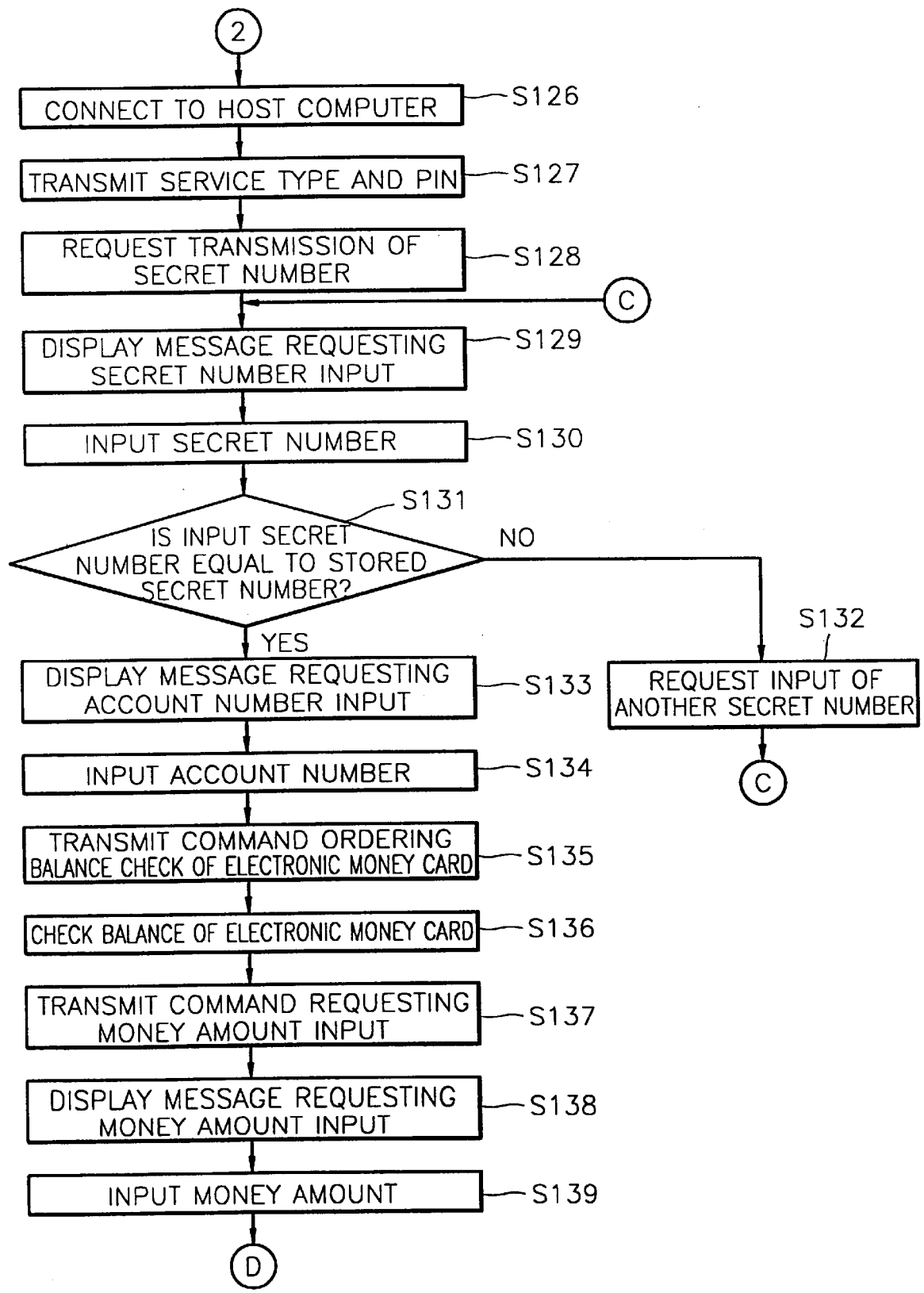

Meanwhile, if the remittance service mode (2) for remitting money from the electronic money card to the user's bank account was selected in step S108, then steps S126 through S145 shown in FIGS. 3C and 3D are performed as follows.

The receiver tries to connect to the host computer of the bank by calling the bank's on-line contact number which is prestored in the memory 222, using the modem 224 (step S126 of FIG. 3C). When the receiver is connected to the host computer of the bank via the modem 224, the controller 206 transmits a service type (in this case, the remittance service 2) desired by the user and the PIN which is stored in the electronic money smart card 212, to the host computer via the modem 224 (step S127). Then, the host computer transmits a command requesting the transmission of the user's secret number, to the controller 206 via the modem 224 (step S128). The controller 206 displays on a screen a message requesting the input of the secret number, by controlling the OSD processor 218 (step S129). When the user inputs through the keypad of the key input unit 200 the secret number in response to the secret number input request message, the controller 206 recognizes the data from the keypad and transmits the same to the host computer via the modem 224 (step S130). The host computer compares the secret number input in step S130 with the user's secret number stored in a database (step S131). If the secret numbers are consistent with each other, the desired remittance service is performed. Otherwise, a command requesting the user to input another secret number is transmitted to the controller 206 via the modem 224 (step S132), and the procedure then returns to the step S129.

When the input secret number is the same as the prestored secret number in step S131, the host computer transmits a control signal to the controller 206 via the modem 224. At this time, the controller 206 displays on a screen a message requesting the input of an account number of the user, by controlling the OSD processor 218 in response to the control signal (step S133). The user inputs an account number through the keypad of the key input unit 200 in response to the account number input request message (step S134).

After the input account number is transmitted to the host computer via the modem 224, the host computer transmits a command, ordering the balance of the electronic money smart card 212 to be checked, to the electronic money smart card 212 via the modem 224 and the controller 206 (step S135). The electronic money smart card 212 checks the balance and transmits to the host computer encoded balance information (step S136). After the host computer transmits a command requesting the input of the amount of money to the controller 206 via the modem 224 (step S137), the controller 206 displays a message requesting the input of the amount of money by controlling the OSD processor 218 (step S138). The user inputs the amount of money through the key input unit 200 in response to the message, and information on the input amount of money is transmitted to the host computer via the controller 206 and the modem 224 (step S139). The host computer compares the amount of money input in step S139 with the balance of the electronic money card checked in step S136 (step S140). When the balance of the electronic money card is smaller than the input amount of money, a control signal indicating the insufficient balance is transmitted to the controller 206 via the modem 224, and the controller 206 displays on a screen a message indicating the insufficient balance, by controlling the OSD processor 218 (step S141 of FIG. 3D).

When the balance of the electronic money card is more than or equal to the input amount of money, a remittance command is generated and transmitted to the electronic money smart card 212 via the modem 224 and the controller 206 (step S142). The electronic money smart card 212 transmits encoded money data corresponding to the input amount of money to the host computer via the controller 206 and the modem 224 (step S143). The electronic money smart card 212 remits the input amount of money to the bank account and adjusts the balance of the electronic money card (step S144). After the host computer informs the controller 206 via the modem 224 that the desired money was remitted from the electronic money card to the user's bank account, the controller 206 displays the balance of the bank account and the new balance of the electronic money card to the user by controlling the OSD processor 218, and completes the remittance service (step S145).

Figure 3E:
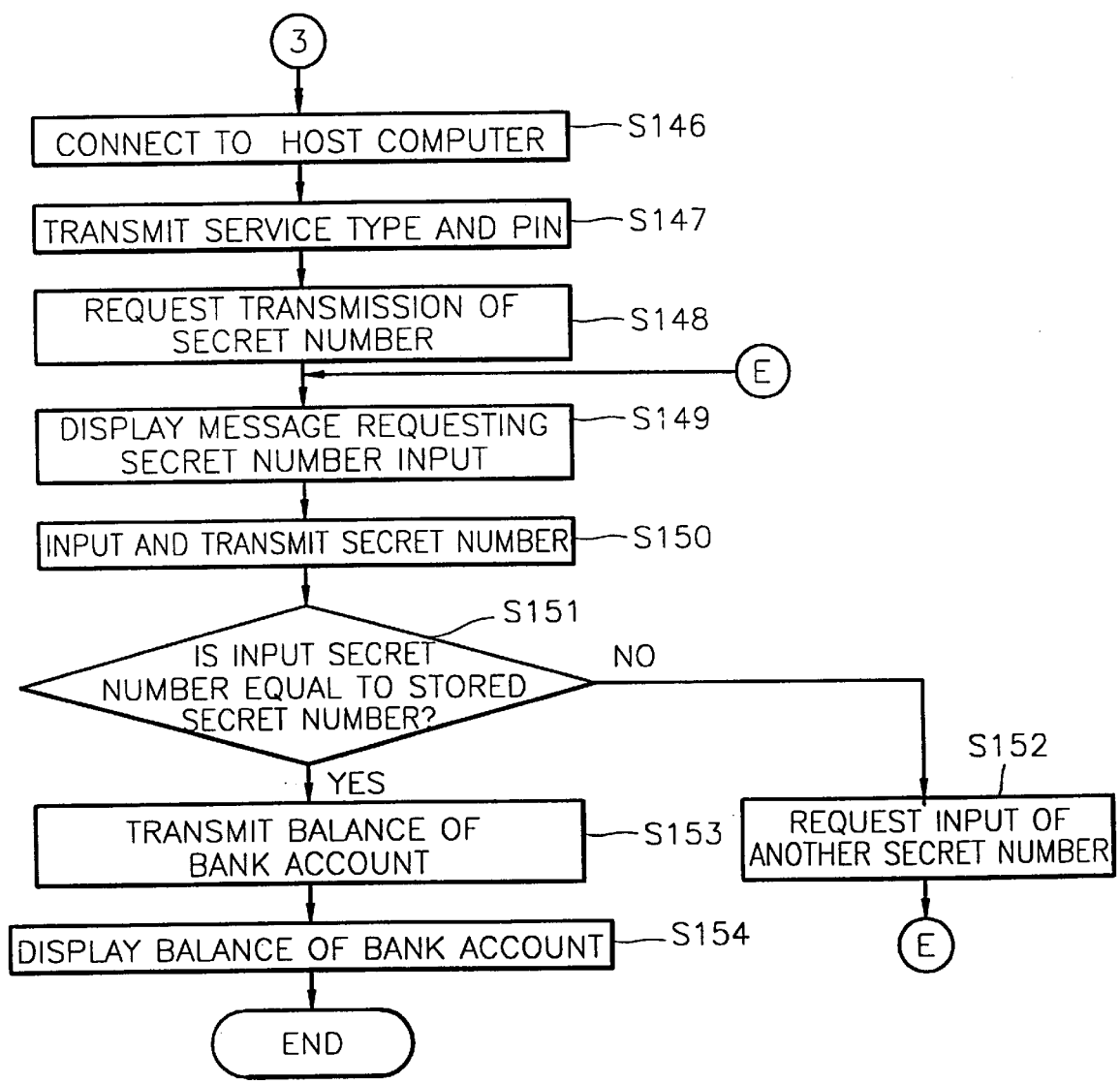

Meanwhile, when the balance inquiry service mode (3) for inquiring about the balance of the user's bank account was selected in step S108, steps S146 through S154 shown in FIG. 3E are performed as follows.

The receiver tries to connect to the host computer of the bank by making a call to the bank's on-line connection number which is prestored in the memory 222 using the modem 224 (step S146). When the receiver is connected to the host computer of the bank via the modem 224, the controller 206 transmits a service type (in this case, the balance inquiry service 3) desired by a user and the PIN stored in the electronic money smart card 212, via the modem 224 to the host computer (step S147). The host computer then transmits a command requesting the transmission of the secret number of the user to the controller 206 via the modem 224 (step S148). At this time, the controller 206 displays on a screen a message requesting the input of the secret number, by controlling the OSD processor 218 (step S149). When the user inputs the secret number through the key input unit 200 in response to the secret number input request message, the controller 206 recognizes the key input data and transmits the user's secret number to the host computer via the modem 224 (step S150). The host computer compares the secret number input at step S150 with the user's secret number stored in a database (step S151). If the secret numbers are identical to each other, the desired balance inquiry service is performed. Otherwise, a command requesting the input of another secret number is transmitted to the controller 206 via the modem 224 (step S152), and the procedure then returns to step S149. When the prestored secret number is consistent with the input secret number in step S151, the host computer transmits information on the balance of the user's bank account to the controller 206 via the modem 224 (step S153). The controller 206 then displays the transmitted balance information by controlling the OSD processor 218, and finishes the balance inquiry service (step S154).

Figure 4:
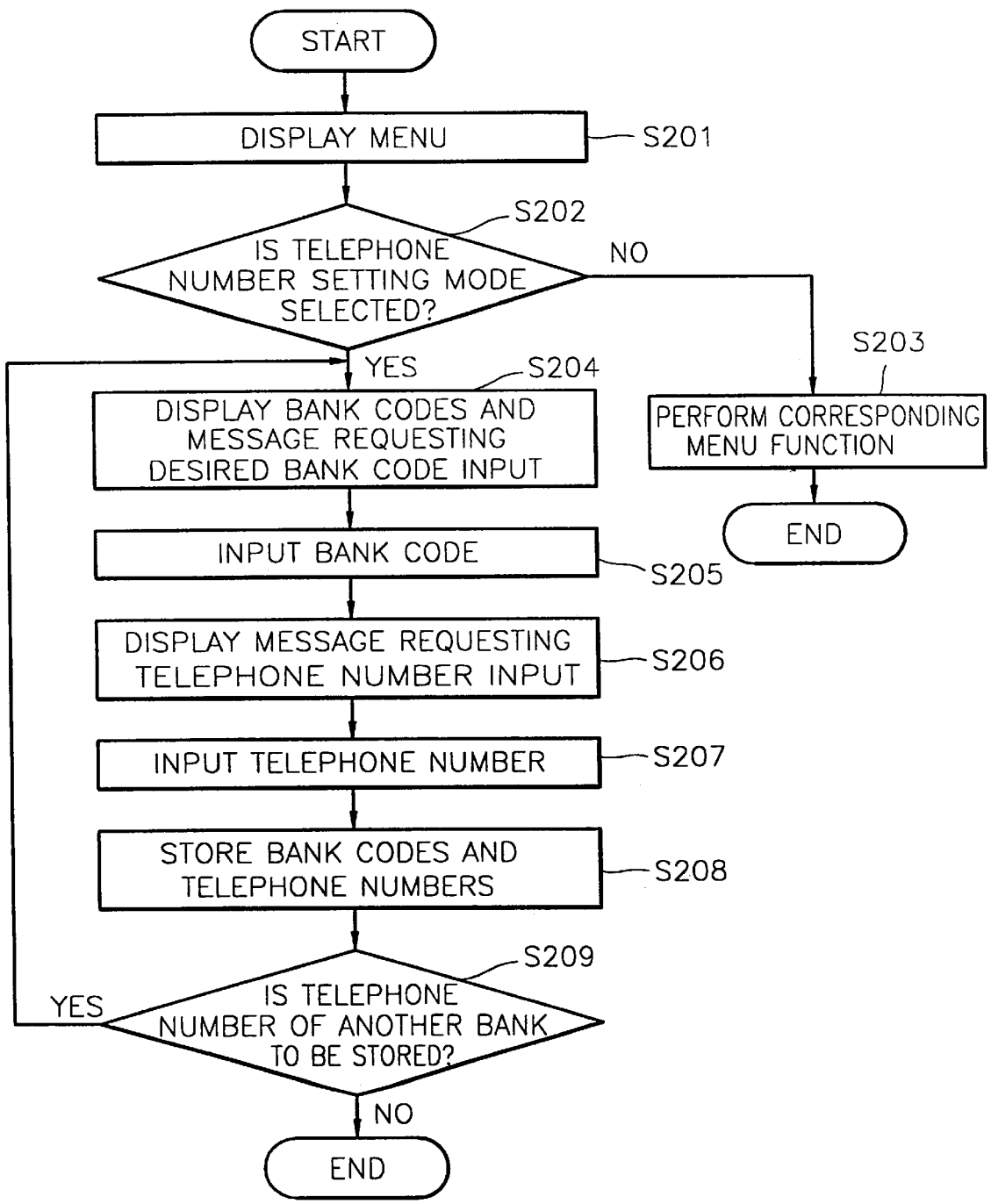
FIG. 4 is a flowchart illustrating a telephone number setting mode to accomplish the electronic money terminal function of the present invention.

FIG. 4 is a flowchart illustrating a process for storing a telephone number of the bank which issues the electronic money card and the user's bank account, to automatically connect the receiver to the host computer of the bank in step S109 of FIG. 3A, step S126 of FIG. 3C and step S146 of FIG. 3E, upon performance of the electronic money terminal function according to the present invention. The method of FIG. 4 can be performed by selecting a telephone number setting mode from a main screen menu, or as part of step S103 of FIG. 3A. Also, this telephone number setting program can be stored in the memory 222.

Referring to FIG. 4, immediately after power is applied to the receiver, the OSD processor 218 displays a menu in response to a control signal of the controller 206 (step S201). A subscriber selects the telephone number setting mode from the displayed menu through the key input unit 200 (step S202). If the telephone number setting mode is not selected in step S202, a function depending on a selected mode is performed (step S203).

When the mode selected in step S202 is the telephone number setting mode, a unique bank code supplied to each bank is read from the memory 222, which stores the respective unique bank codes, and is displayed on a screen simultaneously with a message requesting the input a desired bank code (step S204). A desired bank code among the displayed bank codes is input through the keypad of the key input unit 200 (step S205). After the bank code is input, a message requesting the input of a telephone number of the selected bank is displayed on the screen (step S206). The user inputs the telephone number in response to the telephone number input request message through the keypad of the key input unit 200 (step S207). The input bank code and telephone number are stored in the memory 222 (step S208). It is determined in step S209 whether the telephone number of another bank will be stored. If there is a telephone number of another bank to be stored, the procedure returns to step S204. Otherwise, the process is complete.

The present invention is applicable to not only the satellite broadcasting receiver, but also to all kinds of apparatuses having a modem and a smart card input portion.

As described above, a receiver according to the present invention can perform various functions by being provided with an electronic money terminal function. Also, people do not need to go directly to the bank to deposit or withdraw money to or from an electronic money card.

While the present invention has been described and illustrated with reference to a preferred embodiment thereof, it is to be readily understood that the present invention is not limited to the embodiment, and various changes and modifications can be made therein without departing from the spirit and scope of the invention defined in the appended claims.

What is claimed is:

1. A method for performing an electronic money terminal function using a receiver having a smart card interface and a modem, said method comprising the steps of:

(a) selecting an electronic money terminal mode by inputting an electronic money terminal command to a controller;

(b) receiving an electronic money smart card and initializing said electronic money smart card;

(c) displaying submodes of the selected electronic money terminal mode after said electronic money terminal mode is selected:

(d) selecting a deposit submode from the submodes for depositing money from a user's bank account to said electronic money smart card:

(e) connecting, using said modem, said receiver to a host computer of a bank which issued said electronic money smart card after said electronic money terminal mode is selected;

(f) transmitting a deposit submode signal representing the selected deposit submode and a personal identification number (IN) stored in said electronic money smart card to said host computer:

(g) inputting a secret number in response to a request from said host computer for transmission of the secret number;

(h) inputting an amount of money if said input secret number is identical to a secret number stored in said host computer;

(i) encoding the input amount of money and transmitting the amount of money to said electronic money smart card when a balance of the user's bank account is more than or equal to the input amount of money;

(j) controlling a tuner to receive broadcast information relating to mass media programming via the controller when a mass media reception command is input to said controller to place said receiver in a mass media reception mode;

(k) selecting a remittance submode for remitting an amount of money from said electronic money smart card to the user's bank account, from said submodes displayed in said step (c);

(l) transmitting a remittance submode signal representing said selected remittance submode to said host computer;

(m) if the input secret number is identical to the stored secret number, inputting an account number in response to a request from said host computer for the input of the account number;

(n) encoding a balance of said electronic money smart card in response to said host computer's command ordering a check of the balance of said electronic money smart card, and transmitting information about the encoded balance to said host computer;

(o) inputting an amount of money in response to a request from said host computer for input of an amount of money; and (p) transmitting information about said encoded amount of money from said electronic money smart card to said host computer in response to a remittance command from said host computer, when the balance of said bank account is greater than or equal to said input amount of money.

2. The electronic money terminal method of claim 1, wherein said method further comprises the steps of:

(q) adjusting the balance of said electronic money smart card after said step (p); and (r) displaying the adjusted balance of said electronic money smart card and the balance of the user's bank account to which said input amount of money was deposited.

3. The electronic money terminal method of claim 1, wherein said step (m) further comprises the step of (m1) displaying a message requesting an input of another secret number, when said input secret number is not consistent with said secret number stored in said host computer.

4. The electronic money terminal method of claim 1, wherein said step (p) further comprises the step of (p1) displaying a message indicating an insufficient balance of the user's bank account, when the balance of the user's bank account is smaller than said input amount of money.

5. The electronic money terminal method of claim 1, wherein said method further comprises the steps of:

(q) selecting a balance inquiry submode for inquiring about the balance of a user's bank account, from said submodes displayed in said step (c);

(r) transmitting a balance inquiry submode signal representing said selected balance inquiry submode to said host computer;

(s) displaying a balance of the user's bank account when said input secret number is consistent with the secret number stored in said host computer.

6. The electronic money terminal method of claim 5, wherein said step (a) comprises the steps of:

(a1) displaying a main screen menu containing an electronic money terminal mode option; and (a2) inputting an electronic money terminal command to said controller by selecting the electronic money terminal mode option.

7. The electronic money terminal method of claim 6, wherein said step (a) further comprises the steps of:

(a3) selecting a telephone number setting mode from said main screen menu displayed in said step (a1);

(a4) inputting a bank code and a telephone number of the bank which issued said electronic money smart card; and (a5) storing data representing the input bank code and the telephone number.

8. The electronic money terminal method of claim 7, wherein in said step (e), the telephone number data stored in said step (a5) is used by said modem to connect said receiver to said host computer.

9. The electronic money terminal method of claim 7, wherein said step (l) comprises the steps of:

(l1) connecting, using said modem, said receiver to said host computer of the bank which issued said electronic money smart card; and (l2) using the telephone number data stored in said step (a5) to instruct said modem to connect said receiver to said host computer.

10. The electronic money terminal method of claim 7 wherein said step (r), comprises the steps of:

(r1) connecting, using said modem, said receiver to said host computer of the bank which issued said electronic money smart card; and (r2) using the telephone number data stored in said step (a5) to instruct said modem to connect said receiver to said host computer.

11. A receiver, which receives broadcast information relating to mass media programming and which performs an electronic money terminal function, said receiver comprising:

a tuner that receives said broadcast information relating to said mass media programming when said receiver is operating in a mass media reception mode;

a smart card interface for detecting an input of an electronic money smart card and transmitting a personal identification number (PIN) from said electronic money smart card;

a modem for connecting said receiver to a host computer of a bank;

a memory for storing data representing a screen menu with respect to an electronic money terminal mode and its submodes and data representing a telephone number of the bank which issued said electronic money smart card;

a controller that recognizes said electronic money terminal mode set by a user, said submodes of said electronic money terminal mode, and said mass media reception mode, wherein, during at least one of said electronic money terminal mode and said submodes, said controller transmits said telephone number data to said modem to connect said modem to said host computer, transmits said PIN transmitted via said smart card interface and said recognized submode data to said host computer, and applies a control signal in response to a command for performing said submode transmitted from said host computer via said modem, wherein, during said mass media reception mode, said controller controls said tuner to receive said broadcast information; and an OSD processor for displaying said screen menu as on-screen display (OSD) information and generating a message, which is required to perform said submode, in response to said control signal.

12. The receiver of claim 11, wherein said submode includes at least a deposit submode for depositing money from a user's bank account to said electronic money smart card, a remittance submode for remitting money from said electronic money smart card to the user's bank account, and a balance inquiry submode for inquiring about the balance of the user's bank account.

13. The receiver of claim 11, wherein telephone number data set by a user is stored in said memory.

* * * * *